United States Patent [19]

Ritter

[11] 3,851,193

[45] Nov. 26, 1974

[54] HORIZONTAL CRYSTAL MOUNTING ASSEMBLY

[75] Inventor: George E. Ritter, Mission Viejo, Calif.

[73] Assignee: Hughes Aircraft Company, Culver City, Calif.

[22] Filed: Dec. 10, 1973

[21] Appl. No.: 423,595

[52] U.S. Cl. .......... 310/9.4

[51] Int. Cl. .......... H04r 17/00

[58] Field of Search .......... 310/8.2, 9.1, 9.4, 8.9; 58/23 TF, 23 V

[56] References Cited

UNITED STATES PATENTS

| | | | |
|---|---|---|---|
| 2,326,923 | 8/1943 | Bokovoy | 310/9.4 |
| 2,395,034 | 2/1946 | Bokovoy | 310/9.4 |
| 2,771,561 | 11/1956 | Fuller | 310/9.4 X |
| 3,008,060 | 11/1961 | Mann et al. | 310/9.4 X |
| 3,017,525 | 1/1962 | Wolfskill | 310/9.4 |
| 3,257,704 | 6/1966 | Hafner et al. | 310/9.4 X |
| 3,581,126 | 5/1971 | Omlin | 310/9.4 X |

*Primary Examiner*—Mark O. Budd
*Attorney, Agent, or Firm*—W. H. MacAllister; J. E. Szabo

[57] ABSTRACT

A quartz crystal wafer of the type used in watch oscillator is suspended within an enclosure parallel to its base by a pair of wires, one of which is held by a bracket formed of a flat metal strip which extends from the base to a point above the crystal's upper face.

5 Claims, 6 Drawing Figures

HORIZONTAL CRYSTAL MOUNTING ASSEMBLY

BACKGROUND OF THE INVENTION

Figure 1A:
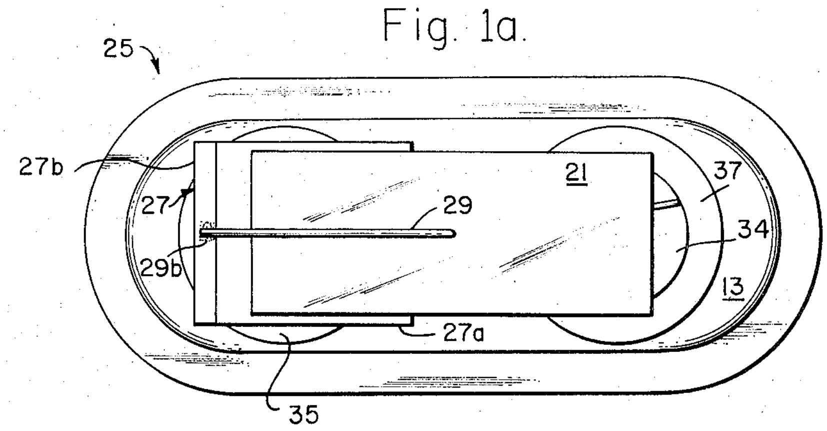

The present invention relates generally to quartz crystals and more particularly to center mounted crystals of very small size.

Watches using quartz crystal oscillators as their time base are becoming increasingly popular. Such watches may have either a digital display or may use conventional hands. In both cases, the key requirement is that the watch components, including the quartz crystal, be small, yet rugged.

Generally, a reduction in crystal size is associated with an increase in its operating frequency. As the frequency goes up and the crystal size goes down, it becomes increasingly difficult to handle the crystal wafer and to make the necessary attachments between it and the mounting structure provided for its support.

Two of the principal types of crystal mounting arrangements which have been used in watches are illustrated in Carpenter et al. U.S. Pat. No. 3,754,153 and Choffat U.S. Pat. No. 3,751,692 on the one hand, and by Mann et al. U.S. Pat. No. 3,008,060 on the other hand. In the first two patents a quartz crystal rod is supported at each of its ends by a pair of wire leads which serve also to make electrical contact. In the last mentioned patent, on the other hand, a quartz crystal wafer is supported by the "center mount" method in which a pair of leads emanates from the centers of the opposite major faces of the wafer. The present invention is directed to the latter type of crystal assembly. Although the Mann et al. patent is not specifically concerned with watch crystals, the suggestion is made that, in order to reduce the height of the crystal assembly the crystal wafer be mounted parallel to the base of the assembly.

Horizontal mounting, that is parallel to the base of the assembly, is accomplished in the Mann et al. patent by providing a pair of wire-like cross members supported above and below the crystal wafer by respective pairs of posts in a tightrope fashion. The center-mount wires emanating from the crystal faces must then be aligned with the cross members and soldered to them.

It is a general object of the present invention to provide a center mounted quartz crystal assembly which has a low profile by virtue of the quartz crystal wafer being mounted horizontally, parallel to the base of the assembly, which is rugged and whose fabrication does not present a manufacturing problem.

A more specific object of the present invention is to simplify the fabrication of a quartz crystal assembly of the type wherein a center mounted quartz crystal is held parallel to the base of the casing.

More particularly, the present invention is aimed at providing a technique for center mounting a quartz crystal wafer which makes it practical to mass produce assemblies having crystals as small as three-sixteenth inches long and one-sixteenth inch wide.

The quartz crystal assembly of the present invention comprises a casing having a base transpierced by two spaced apart terminal posts with a quartz crystal wafer extending parallel to the base. Electrical contact is established from one of the posts to the upper face of the crystal wafer by means which include a bracket fastened at one of its ends to the base and extending from the base to a level above the upper face of the wafer and having an extended, substantially flat surface at that level. A flexible wire lead emanating from the center of the upper face of the wafer is attached to the free, flat end of the bracket to establish electrical contact thereto. Means are also provided to establish electrical contact from the other post to the center of the lower face of the wafer, the latter means being characterized in that it terminates in a second flexible wire bonded to the wafer at its lower center.

By providing a bracket which provides an extended, substantially flat surface above the quartz crystal wafer, the alignment of the upper wire lead to that bracket is greatly simplified, particularly so when the bracket is provided with a surface which is parallel to the upper face of the quartz crystal.

In one of the illustrated embodiments, in keeping with the present invention, the bracket is L-shaped, with one of its arms being fastened to the base of the casing and the other of its arms extending upward next to but spaced from the wafer. With an L-shaped bracket the wire emanating from the top face of the crystal is soldered to the top of its upwardly extending arm.

In another illustrated embodiment of the present invention, the bracket is U-shaped, one arm of the U being fastened down to the base of the casing, the bight of the U extending around the edge of the wafer and the other arm of the U extending over the wafer from its edge towards its center. A particular advantage of this configuration is the provision of a large area on the bracket which extends parallel to the upper face of the wafer to which area the connecting wire emanating from the crystal wafer may be very conveniently soldered or otherwise attached.

Figure 1B:
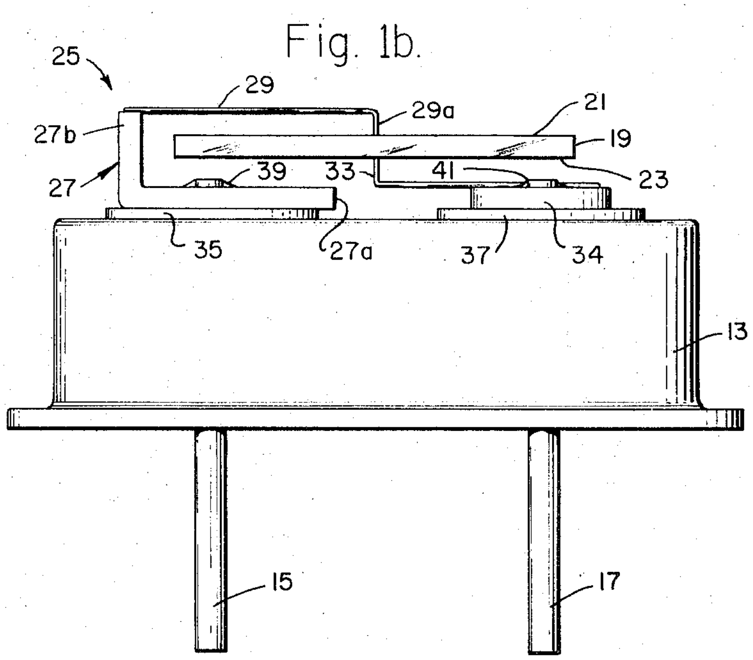
Figure 1C:
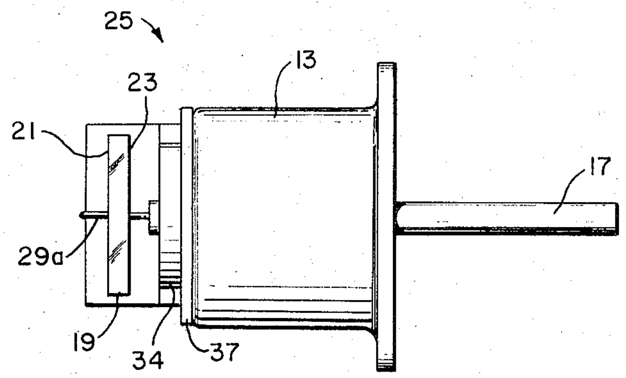

Additional features and advantages of the invention will become apparent from the following figures in which:

FIGS. 1*a*, 1*b*, and 1*c* are plan, side, and end views of a first embodiment of the present invention featuring an L-shaped bracket for supporting the upper connecting wire of a quartz crystal wafer.

Figure 2A:
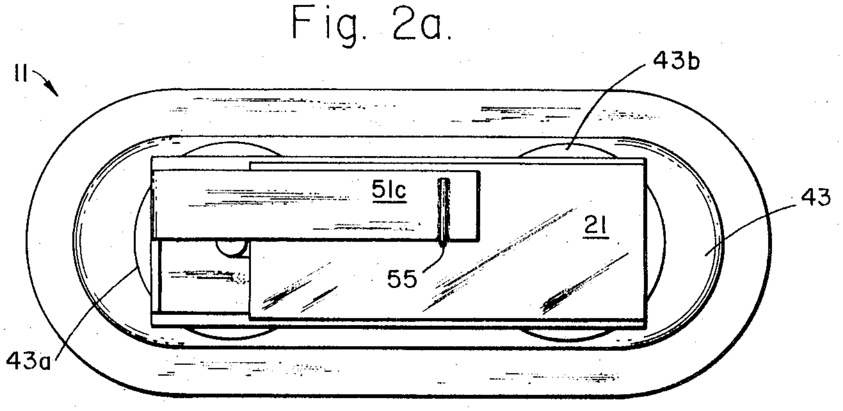
Figure 2B:
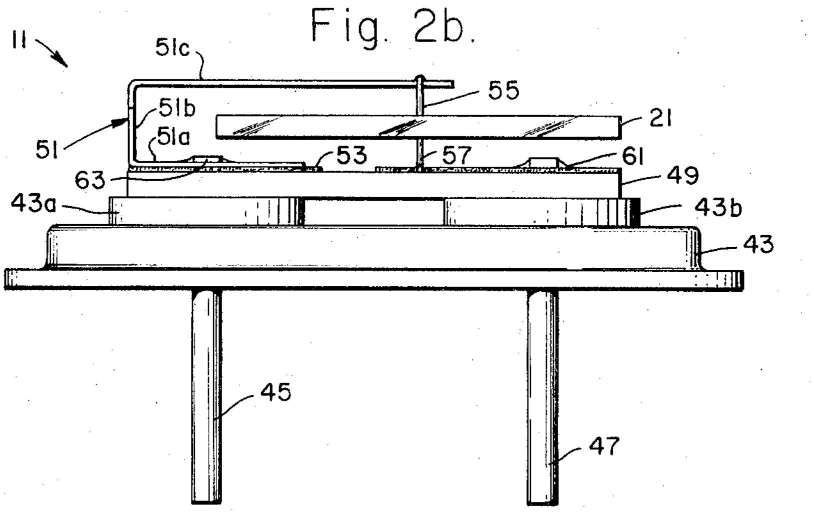
Figure 2C:
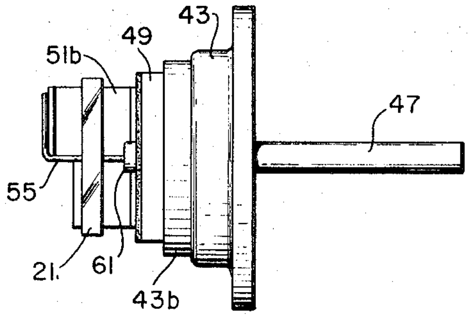

FIGS. 2*a*, 2*b*, and 2*c* are plan, side, and end views of a second embodiment of the present invention featuring a U-shaped bracket for the just mentioned purpose.

Turning next to the figures, there is shown in FIGS. 1*a*, 1*b*, and 1*c* a quartz crystal assembly 11 which includes, in addition to a metal can (not shown), a base 13 transpierced by a pair of spaced apart metal terminal posts 15 and 17. The base 13 is of conventional construction, and comprises a glass core clad with a metal shell, there being an airtight metal-to-glass seal between posts 15 and 17 and the glass core of the base 13. Supported parallel to the base 13 but spaced above it is quartz crystal wafer 19 which in the illustrated embodiment is shown to be rectangular and whose typical size is on the order of one-fourth by three thirty-seconds of an inch. A thin layer of metal coats the upper and lower major faces 21 and 23 of the quartz crystal wafer 19, these layers serving as electrodes for imposing an electric field on the crystal in order to induce dimensional changes therein. Means 25 are provided for making electrical contact from the post 15 to the upper face 21 of the wafer and include a bracket 27 formed of a flat metal strip fastened at one ends **27*a* to the base 13 and extending from the base to a level above the upper face 21 of the wafer. In the embodiment shown in FIG. 1, the above mean takes the form of an L-shaped bracket 27 whose one arm 27*a* is fastened to the base 13 and whose other arm 27b extends upwardly to a level above the crystal 19. In keeping with the present invention, the means 25 for establishing contact between the post 15 and the crystal 19 also includes a wire lead 29 which is bonded at one of its ends to the center of the crystal 19, at point 29a, and which is fastened typically by soldering at its opposite end to the top of the L-shaped bracket 27 shown at 29b. The latter operation may be facilitated by pretinning the top of the bracket 27.**

It may be seen particularly from FIG. 1a that the precise orientation of the wire 29 is not critical but may vary from that shown in FIG. 1b by several degrees without removing the end of the wire from the top of the bracket 27.

Means 31 are also provided for making electrical contact from the other post 17 to the bottom face 23 of the crystal 19. In the embodiment illustrated in FIGS. 1a–1c, the latter means 31 includes a second connecting wire 33 which emanates from and is bonded to the center of the bottom crystal face 23 and which is connected at its opposite end to a metal washer 34.

Electrical contact between the L-shaped bracket 27 and its associated terminal post 15 is provided by a solder joint shown at 39 between them. A similar contact between the post 17 and the washer 34 is provided by a solder joint 41. Again, it may be seen from inspection of FIG. 1a that the connection of the lead 33 to the metal washer 34 does not present an alignment problem because of the large surface presented by the washer to the lead whose end runs parallel to the washer.

In order to prevent short circuiting between the leads 29 and 33 through the bracket 27, the case 13, and the washer 34, insulating washers 35 and 37 separate the bracket 27 and the washer 34 from the metal clad base 13.

A second and preferred embodiment of the invention as illustrated in FIGS. 2a, 2b, and 2c. It differs from the first illustrated embodiment in several respects, among them, construction of the base, the provision of an insulating substrate by means of which the crystal is mounted on the base, and the configuration of the mounting bracket whereby the upper connecting center mount wire is held.

The base 43, as best seen in FIG. 2a, differs from that illustrated in FIGS. 1a–1c in that it is much thinner, and in that instead of a glass core it is of solid metal except for two glass feed-throughs around its pair of terminal posts 45 and 47. Additionally, the base 43 is also provided with a pair of metal pedestals 43a and 43b of circular configuration. Mounted on top of the pedestals is an insulating substrate 49 which serves to isolate the crystal mounting structure, which is to be described, from the effects of flexing of the base through the terminals. Preferably, the substrate is provided with two pre-solder coated areas 53 and 59.

In accordance with the present invention, in its preferred mode, there is mounted upon one side of the substrate's upper face a U-shaped bracket 51 having a first arm lying upon the pre-solder coated area 53 provided on the substrate 49, an intermediate or bight portion 51b which extends around one end of the crystal 21 to a level which is above the upper surface of that crystal, and a second arm 51c which extends from a point beyond the end of the crystal 21 to a point which is above its center. Preferably, the clip or bracket 51 is also solder coated, thus facilitating attachment to the substrate 49 by simply touching a hot soldering iron to the bottom arm 51a, causing the solder coating to melt both on that arm and on the substrate 49.

In further keeping with the invention, the upper arm 51c of the clip 51 is confined to an area above the crystal 21 to one side of its center. It is thus made possible to attach the upper center mount wire 55 emanating from the upper center of the crystal to the upper surface of the clip arm 51c by first leading the wire 55 directly upward and then bending it over so as to cause it to lie on the upper surface of the clip arm 51c to which it may then be readily soldered. As best seen from FIG. 2a, the bottom arm 51a of the clip is bifurcated, with each half of the arm extending along one side of the post 45. Preferably, the bottom arm 51a is made as wide as possible relative to the substrate 49 so as to provide maximum support for the upper arm 51c.

Connection to the bottom center of the crystal 21 is made through a second center mount wire 57 which emanates therefrom downwardly and is then bent at a right angle to extend along the second solder-coated surface 59 of the substrate 49. Solder connections between the center-mount wire 55 and 57 to the clip arm 51c and to the substrate 59 are thus facilitated by the fact that they are both solder coated. Connection from the bottom center-mount wire 57 to the post 47 is completed through the solder coating 59 on the substrate 49, contact being further insured by a solder connection 61 at the top of the post 47. A similar solder connection 63 is also made at the top of the post 45.

A significant advantage of the embodiment illustrated in FIGS. 2a–2c is that it provides two substantial surfaces, one on each side of the quartz crystal 21, to which the crystal's center mount wires may be connected without any need to accurately align the wires in a plane parallel to the crystal's surface. Moreover, alignment of the leads in a plane which is at right angles to the crystal's surface is facilitated by the fact that the wires need simply e placed on top of the surfaces to which they are to be soldered. A further advantage of the embodiment illustated in FIGS. 2a–2c is that the length of the center mount wires 55 and 57 has been reduced to a minimum. The members to which the wires are anchored are much more rigid than the wires themselves, so that even though their length is substantial, in particular that of the clip 51, the rigidity of the entire structure is much greater than it would be if an attempt were made to connect the top center-mount wire 55 directly to the base 43 or to the substrate 49. The use of a bracket as taught herein is also superior in rigidity and in ease of manipulation in assembly to mounting constructions in which the center mount wires are in turn mounted upon the wires or thin rods which are then hung between posts in the manner taught in the above-referenced U.S. Pat. No. 3,008,060.

What is claimed is:

1. A quartz crystal assembly comprising in combination:

a. a casing having a base transpierced by two spaced-apart terminal posts;

b. a quartz crystal wafer, with its major faces extending parallel to said base;

c. means for making electrical contact from one of said posts to the upper face of said wafer, said means including:

1. a U-shaped bracket having one arm fastened to the base of said casing, the bight of the U extending around the edge of said wafer and the other arm of the U extending over said wafer from its edge towards its center, said other arm having an extended, substantially flat surface over said wafer, and
2. a flexible wire lead attached to said surface and to the center of the upper face of said wafer; and d. means for making electrical contact from the other of said posts to the lower major face of said wafer:

1. said means terminating in a second flexible wire bonded to the center of the lower face of said wafer.

2. The assembly of claim 1 characterized further in that said other arm of said bracket is offset from the center of said upper wafer face and in that said flexible wire extends directly from said face toward and above said other arm and is bentover and bonded to its upper surface.

3. The assembly of claim 2 characterized further in that said one arm is more than half as wide as said wafer and in that said upper arm is less than half as wide as said wafer.

4. The assembly of claim 2 characterized further in that said one arm is at least as wide as said wafer and said upper arm is less than half as wide as said wafer.

5. A quartz crystal assembly comprising in combination:

a. a casing having a base transpierced by two spaced-apart terminal posts;

b. a quartz crystal wafer, with its major faces extending parallel to said base;

c. means for making electrical contact from one of said posts to the upper face of said wafer, said means including:

1. a bracket fastened at one end to the base of said casing and extending from said base to a level above the upper face of said wafer and having an extended, substantially flat surface at said level, and
2. a flexible wire lead attached to said surface and to the center of the upper face of said wafer; and d. means for making electrical contact from the other of said posts to the lower major face of said wafer, said means including:

1. a metal washer bonded to said other post,
2. an insulating substrate sandwiched between the base of said casing on one side and said bracket and metal washer on the other side, and
3. a second flexible wire bonded to the center of the lower face of said wafer and to said metal washer.

* * * * *